United States Patent
Kang et al.

(10) Patent No.: US 9,264,185 B2
(45) Date of Patent: Feb. 16, 2016

(54) PACKET PROCESSING APPARATUS AND METHOD FOR DETECTING DUPLICATE ACKNOWLEDGEMENT PACKET

(75) Inventors: Dong-Won Kang, Daejeon-si (KR); Joon-Kyung Lee, Daejeon-si (KR); Sang-Wan Kim, Daejeon-si (KR); Wang-Bong Lee, Daejeon-si (KR); Sang-Sik Yoon, Daejeon-si (KR); Jong-Dae Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 13/620,189

(22) Filed: Sep. 14, 2012

(65) Prior Publication Data
US 2013/0194934 A1 Aug. 1, 2013

(30) Foreign Application Priority Data
Jan. 27, 2012 (KR) .................. 10-2012-0008499

(51) Int. Cl.
*H04L 1/18* (2006.01)
*H04L 29/06* (2006.01)

(52) U.S. Cl.
CPC .............. *H04L 1/188* (2013.01); *H04L 69/163* (2013.01)

(58) Field of Classification Search
CPC ........ H04L 69/16; H04L 1/188; H04L 69/163
USPC .......................................... 370/242
See application file for complete search history.

(56) References Cited

U.S. PATENT DOCUMENTS

| | | | | |
|---|---|---|---|---|
| 6,622,172 B1* | 9/2003 | Tam | ........................ | 709/232 |
| 2005/0213586 A1* | 9/2005 | Cyganski | ........... | H04L 41/0896 370/395.41 |
| 2007/0230337 A1* | 10/2007 | Igarashi | ................. | H04L 1/188 370/230 |
| 2007/0288824 A1* | 12/2007 | Yeo | ....................... | H04L 1/1614 714/749 |
| 2008/0117907 A1* | 5/2008 | Hein | .................... | H04L 12/2697 370/392 |
| 2009/0016379 A1* | 1/2009 | Takagi et al. | ................. | 370/474 |
| 2009/0059928 A1* | 3/2009 | Enomoto | .............. | H04L 1/1841 370/394 |
| 2010/0027424 A1* | 2/2010 | Radunovic | ........... | H04W 40/04 370/238 |
| 2010/0220728 A1* | 9/2010 | Williams | .............. | H04L 1/0041 370/394 |
| 2011/0206043 A1* | 8/2011 | Williams | .............. | H04L 1/0041 370/389 |
| 2011/0239073 A1* | 9/2011 | Imai | ....................... | H04L 1/188 714/748 |
| 2011/0280240 A1* | 11/2011 | Yamagaki et al. | ........... | 370/389 |

FOREIGN PATENT DOCUMENTS

WO 2010/149075 A1 12/2010

* cited by examiner

*Primary Examiner* — Asad Nawaz
*Assistant Examiner* — Syed S Ali
(74) *Attorney, Agent, or Firm* — Nelson Mullins Riley & Scarborough LLP; Anthony A. Laurentano; Michael Malone

(57) ABSTRACT

Provided are a packet processing apparatus and method for detecting a duplicate acknowledgement (ACK) packet. The packet processing apparatus initiates a session and then detects a retransmission packet and a duplicate ACK packet from input/output packets using statistic information related to packet retransmission. Accordingly, unnecessary traffic generated regardless of a user's intension can be blocked.

17 Claims, 5 Drawing Sheets

PACKET PROCESSING APPARATUS AND METHOD FOR DETECTING DUPLICATE ACKNOWLEDGEMENT PACKET

CROSS-REFERENCE TO RELATED APPLICATION

This application claims the benefit under 35 U.S.C. §119(a) of a Korean Patent Application No. 10-2012-0008499, filed on Jan. 27, 2012, the entire disclosure of which is incorporated herein by reference for all purposes.

BACKGROUND

1. Field

The following description relates to network management and service technology, and more particularly, to packet processing technology.

2. Description of the Related Art

Depending on network conditions, packet loss may occur regardless of a user's intention. The packet loss requires packet retransmission, leading to the generation of a duplicate acknowledgement (ACK) packet. Such unnecessary traffic can overload the network.

SUMMARY

The following description relates to a processing apparatus and method for detecting a duplicate acknowledgement (ACK) packet which is generated regardless of a user's intention.

In one general aspect, there is provided a packet processing apparatus including: a session processing unit initiating and managing a session; a statistic information storage unit storing statistic information related to packet retransmission; and a packet detection unit detecting a retransmission packet and a duplicate ACK packet from input/output packets using the statistic information stored in the statistic information storage unit when the session processing unit initiates a session.

In another aspect, there is provided a packet processing method including: initiating a session; and detecting a retransmission packet and a duplicate ACK packet from input/output packets using statistic information related to packet retransmission when the session is initiated.

Other features and aspects will be apparent from the following detailed description, the drawings, and the claims.

Figure 1:
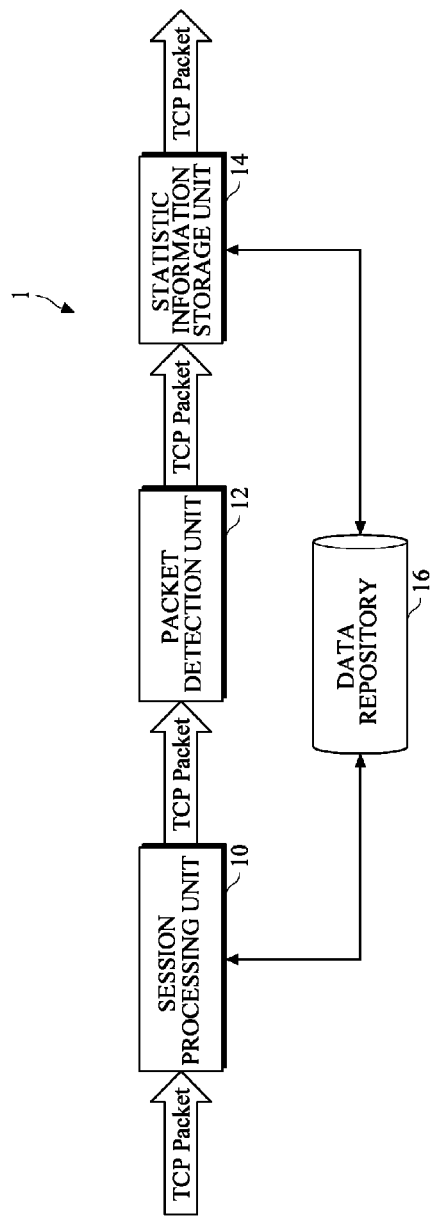
FIG. 1 is a diagram illustrating the configuration of a packet processing apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. Descriptions of well-known functions and constructions are omitted to increase clarity and conciseness. Also, the terms used in the following description are terms defined taking into consideration the functions obtained in accordance with the present invention, and may be changed in accordance with the option of a user or operator or a usual practice. Therefore, the definitions of these terms should be determined based on the entire content of this specification.

FIG. 1 is a diagram illustrating the configuration of a packet processing apparatus 1 according to an embodiment of the present invention.

The packet processing apparatus 1 includes a session processing unit 10, a packet detection unit 12, a statistic information storage unit 14, and a data repository 16.

Depending on network conditions, packet loss may occur regardless of a user's intention. The packet loss requires packet retransmission, leading to the generation of a duplicate acknowledgement (ACK) packet. The packet processing apparatus 1 according to the present invention detects such duplicate ACK packets based on packet analysis and collects statistic information obtained through the packet analysis.

Specifically, the session processing unit 10 initiates and manages a session. According to an embodiment, the session processing unit 10 initiates and manages a transmission control protocol (TCP) session. TCP is a protocol located at the transport layer and widely used for various network communications. According to an embodiment, the session processing unit 10 stores necessary information in the data repository 16, so that a TCP session can be analyzed for each group of packets that have the same information about five items, i.e., the destination address, source address, destination port, source port, and protocol of a TCP/IP header. In addition, the session processing unit 10 terminates sessions that are no longer valid.

When the session processing unit 10 initiates a session, the packet detection unit 12 detects a retransmission packet and a duplicate ACK packet from input/output packets. The input/output packets may be TCP packets. The packet detection unit 12 uses statistic information for packet detection. The statistic information may include a history of ACKs resulting from packet retransmissions and information about the number of retransmissions.

According to an embodiment of the present invention, the packet detection unit 12 classifies and detects a retransmission packet as one of two types: a fast retransmission packet and a time-out retransmission packet. The fast retransmission packet is a retransmission packet generated in response to a duplicate ACK sent by a receiving end to notify a transmitting end of a packet loss when the receiving end presumes the occurrence of the packet loss. The time-out retransmission packet is a retransmission packet generated when the transmitting end fails to receive an ACK until a predetermined period of time elapses and presumes the failure of receiving the ACK as a packet loss.

According to an embodiment of the present invention, the packet detection unit 12 classifies and detects a duplicate ACK packet as one of two types: a duplicate ACK related to a time-out retransmission and a duplicate ACK related to a fast retransmission.

The statistic information storage unit 14 stores statistic information related to packet retransmission in the data repository 16. Here, the statistic information storage unit 14 may store a history of ACKs that led to fast retransmissions and a history of ACKs that led to time-out retransmissions separately in the data repository 16. In addition, the statistic information storage unit 14 may store only a predetermined amount or more of information in order of latest to oldest by using a ring buffer algorithm.

Figure 2:
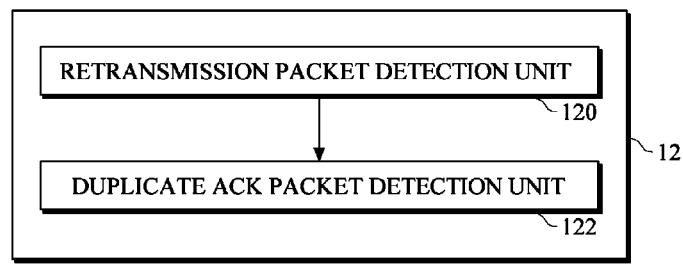
FIG. 2 is a diagram illustrating the detailed configuration of a packet detection unit according to an embodiment of the present invention.

FIG. 2 is a diagram illustrating the detailed configuration of the packet detection unit 12 shown in FIG. 1.

The packet detection unit 12 includes a retransmission packet detection unit 120 and a duplicate ACK packet detection unit 122.

The retransmission packet detection unit 120 detects retransmission packets including a fast retransmission packet and a time-out retransmission packet. An embodiment in which the retransmission packet detection unit 120 detects a retransmission packet will be described later with reference to FIG. 4.

The duplicate ACK packet detection unit 122 detects duplicate ACK packets including a fast duplicate ACK packet and a time-out ACK packet. An embodiment in which the duplicate ACK packet detection unit 122 detects a duplicate ACK packet will be described later with reference to FIG. 5.

Figure 3:
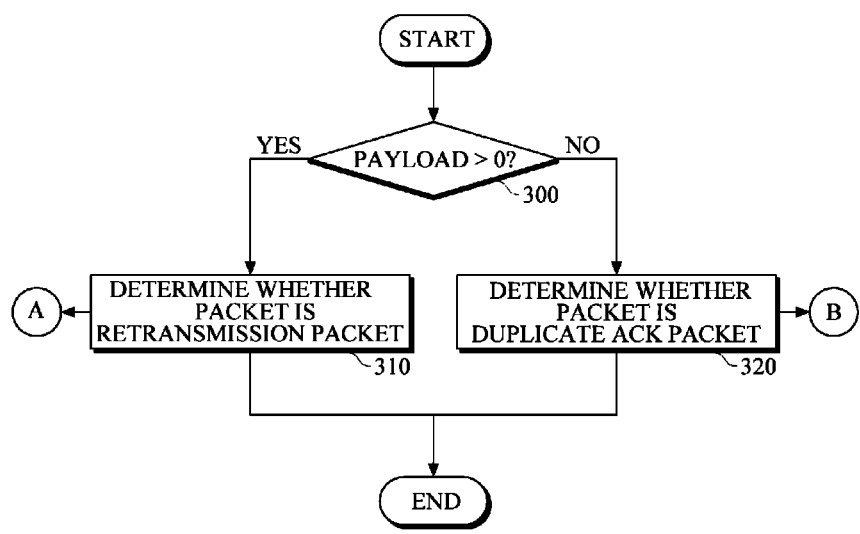
FIG. 3 is a flowchart illustrating a packet processing method according to an embodiment of the present invention.

FIG. 3 is a flowchart illustrating a packet processing method according to an embodiment of the present invention.

The packet processing apparatus 1 determines whether an input/output packet is a potential retransmission packet or a potential duplicate ACK packet based on whether the input/output packet includes a payload. That is, it is determined whether the input/output packet includes the payload (operation 300). When the input/output packet includes the payload, it is determined that the input/output packet is a potential retransmission packet. Then, it is determined whether the potential retransmission packet is a retransmission packet (operation 310). When the input/output packet does not include the payload, it is determined that the input/output packet is a potential duplicate ACK packet. Then, it is determined whether the potential duplicate ACK packet is a duplicate ACK packet (operation 320). A detailed process of detecting a retransmission packet will be described in FIG. 4, and a detailed process of detecting a duplicate ACK packet will be described in FIG. 5.

Figure 4:
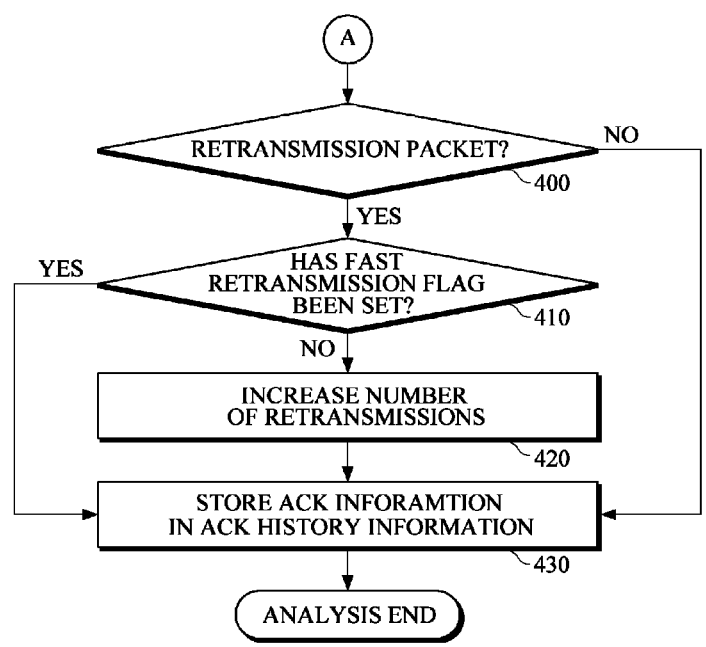
FIG. 4 is a flowchart illustrating a method of detecting a retransmission packet according to an embodiment of the present invention.

FIG. 4 is a flowchart illustrating a method of detecting a retransmission packet according to an embodiment of the present invention.

The packet processing apparatus 1 determines whether a potential retransmission packet which includes a payload is a retransmission packet based on ACK history information (operation 400).

When it is determined in operation 400 that the potential retransmission packet is the retransmission packet, it is determined whether a fast retransmission flag has been set by a previous detection process (operation 410).

When it is determined in operation 410 that the fast retransmission flag has been set, the retransmission packet is determined to be a fast retransmission packet. When it is determined in operation 410 that the fast retransmission flag has not been set, the retransmission packet is determined to be a time-out retransmission packet. When the retransmission packet is determined to be the time-out retransmission packet, a retransmission count is increased (operation 420). The retransmission count is used as a conditional variable for detecting a duplicate ACK packet resulting from a time-out retransmission. Then, ACK information of the retransmission packet determined to be the time-out retransmission packet is stored in the ACK history information (operation 430). On the other hand, when it is determined in operation 410 that the fast retransmission flag has been set, the retransmission packet is determined to be the fast retransmission packet, and ACK information of the retransmission packet determined to be the fast retransmission packet is stored in the ACK history information (operation 430).

Figure 5:
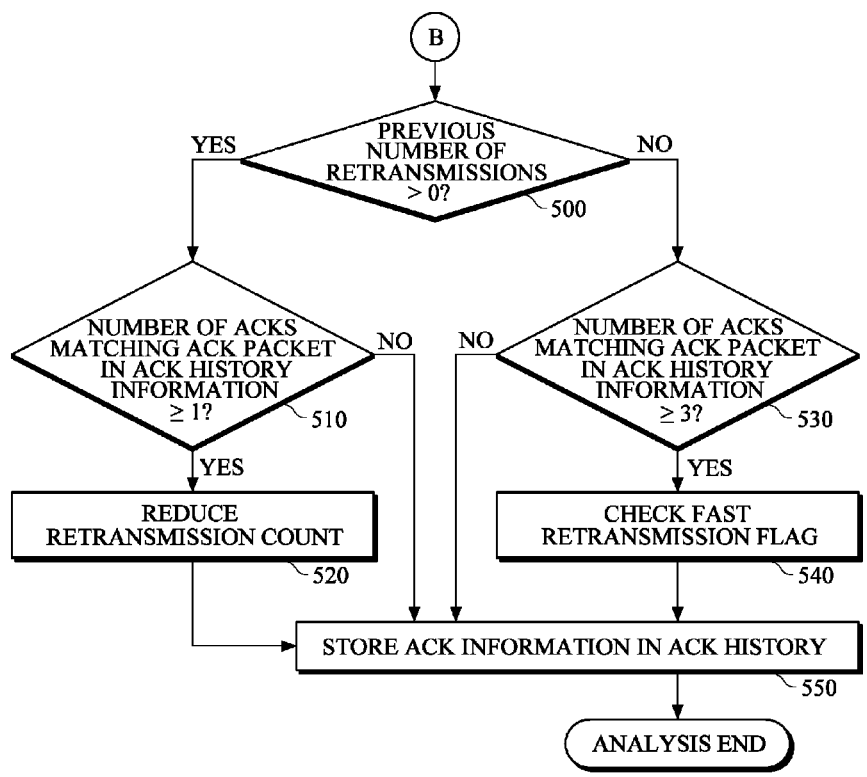
FIG. 5 is a flowchart illustrating a method of detecting a duplicate acknowledgement (ACK) packet according to an embodiment of the present invention.

FIG. 5 is a flowchart illustrating a method of detecting a duplicate ACK packet according to an embodiment of the present invention.

The packet processing apparatus 1 determines whether a potential duplicate ACK packet which does not include a payload is likely to be a duplicate ACK resulting from a time-out retransmission or a duplicate ACK resulting in a fast retransmission based on a previous number of retransmissions (operation 500).

When the previous number of retransmissions is greater than zero, the packet processing apparatus 1 determines that the potential duplicate ACK packet is likely to be the duplicate ACK resulting from the time-out retransmission. When the previous number of retransmissions is zero or less than zero, the packet processing apparatus 1 determines that the potential duplicate ACK packet is likely to be the duplicate ACK resulting in the fast retransmission.

After operation 500, the packet processing apparatus 1 determines whether the potential duplicate ACK packet is a duplicate ACK packet resulting from a time-out retransmission or a duplicate ACK packet resulting in a fast retransmission based on ACK history information.

Specifically, when the potential duplicate ACK packet is likely to be the duplicate ACK resulting from the time-out retransmission, the packet processing apparatus 1 checks the ACK history information and determines that the potential duplicate ACK packet is the duplicate ACK packet resulting from the time-out retransmission when one or more ACKs matching the potential duplicate ACK packet exist in the ACK history information (operation 510). Then, the packet processing apparatus 1 reduces a retransmission count to indicate that the potential duplicate ACK packet has been determined to be the duplicate ACK packet resulting from the time-out retransmission (operation 520).

Meanwhile, when the potential duplicate ACK packet is likely to be the duplicate ACK resulting in the fast retransmission, the packet processing apparatus 1 checks the ACK history information and determines that the potential duplicate ACK packet is the duplicate ACK packet resulting in the fast retransmission when the number of ACKs matching the potential duplicate ACK packet is equal to or greater than a preset number (operation 530). Here, the preset number may be three. The packet processing apparatus 1 checks a fast retransmission flag to notify that a fast retransmission will occur (operation 540). The fast retransmission flag is used to determine whether a packet is a fast retransmission packet or a time-out retransmission packet. Thereafter, the packet processing apparatus 1 stores the ACK information in the ACK history (operation 550).

As described above, depending on network conditions, packet loss may occur regardless of a user's intention. The packet loss requires packet retransmission, leading to the generation of a duplicate ACK packet. According to an embodiment of the present invention, such a duplicate ACK packet can be detected, thereby blocking unnecessary traffic.

Further, duplicate ACK packets generated regardless of a user's intention can be detected, and statistic information related to the duplicate ACK packets can be collected and utilized. The statistic information can be utilized for, e.g., the precision billing system and control in a wireless Internet service subject to usage-based billing.

The present invention has a simple structure and can detect a retransmission packet and a duplicate ACK packet resulting from a retransmission using minimum system resources.

Moreover, the present invention is capable of fast processing in various systems and network environments due to its simple and light structure.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A packet processing apparatus comprising:
   a memory; and
   a processor configured to:
      initiate and manage, by a session processing unit, a session;
      store, by a statistic information storage unit, statistic information related to packet retransmission and packet information in the memory, wherein the packet information comprises a destination address, a source address, a destination port, a source port, and a protocol of a header;
      analyze the packet information for each group of input/output packets that have the same packet information;
      determine, by a packet detection unit, statistic information based on the packet information, a retransmission flag, a number of retransmissions of the input/output packet, and history information of acknowledgements (ACKs) resulting from the retransmissions of the input/output packet;
      classify and detect a retransmission of the input/output packet and a duplicate acknowledgement (ACK) packet resulting from the retransmission of the input/output packet using the statistic information; and
      determine, by a retransmission packet detection unit, whether a fast retransmission flag has been set by a previous detection process when determining that a potential retransmission packet is the retransmission packet,
   wherein the retransmission packet detection unit determines the retransmission packet to be a fast retransmission packet when determining that the fast retransmission flag has been set and determines the retransmission packet to be a time-out retransmission packet when determining that the fast retransmission flag has not been set,
   wherein the retransmission packet detection unit increases a retransmission count when determining that the retransmission packet is the time-out retransmission packet;
   wherein the retransmission packet detection unit stores ACK information of the retransmission packet in the ACKs history information, and
   wherein the retransmission count is used as a conditional variable for detecting a duplicate ACK packet resulting from a time-out retransmission.

2. The apparatus of claim 1, wherein the session processing unit initiates a transmission control protocol (TCP) session, and the packet detection unit detects the retransmission packet and the duplicate ACK packet from TCP packets.

3. The apparatus of claim 1, wherein the packet detection unit comprises:
   the retransmission packet detection unit detecting retransmission packets comprising the fast retransmission packet and the time-out retransmission packet; and
   a duplicate ACK packet detection unit detecting the duplicate ACK packets comprising a fast duplicate ACK packet and a time-out duplicate ACK packet.

4. The apparatus of claim 3, wherein the retransmission packet detection unit detects the potential retransmission packet which comprises a payload and determines whether the potential retransmission packet is the retransmission packet based on the ACKs history information.

5. The apparatus of claim 3, wherein the duplicate ACK packet detection unit detects a potential duplicate ACK packet which does not comprise a payload, determines whether the potential duplicate ACK packet is likely to be the duplicate ACK resulting from the time-out retransmission or the duplicate ACK resulting in the fast retransmission based on the number of retransmissions, and determines whether the potential duplicate ACK packet is the duplicate ACK packet resulting from the time-out retransmission or the duplicate ACK packet resulting in the fast retransmission based on the ACKs history information.

6. The apparatus of claim 5, wherein the duplicate ACK packet detection unit determines that the potential duplicate ACK packet is likely to be the duplicate ACK resulting from the time-out retransmission when the number of retransmissions is greater than zero and determines that the potential duplicate ACK packet is likely to be the duplicate ACK resulting in the fast retransmission when the number of retransmissions is zero or less than zero.

7. The apparatus of claim 5, wherein when the potential duplicate ACK packet is likely to be the duplicate ACK resulting from the time-out retransmission, the duplicate ACK packet detection unit determines that the potential duplicate ACK packet is the duplicate ACK packet resulting from the time-out retransmission when one or more ACKs matching the potential duplicate ACK packet exist in the ACKs history information and reduces the retransmission count.

8. The apparatus of claim 5, wherein when the potential duplicate ACK packet is likely to be the duplicate ACK resulting in the fast retransmission, the duplicate ACK packet detection unit determines that the potential duplicate ACK packet is the duplicate ACK packet resulting in the fast retransmission when the number of ACKs matching the potential duplicate ACK packet in the ACKs history information is equal to or greater than a preset number and checks the fast retransmission flag.

9. The apparatus of claim 5, wherein the statistic information storage unit stores ACK information of the time-out retransmission packet in a time-out retransmission ACK history information when the retransmission packet detection unit determines that the potential retransmission packet is the time-out retransmission packet and stores ACK information of the fast retransmission packet in a fast retransmission ACK history information, which is separate from the time-out retransmission ACK history information, when the retransmission packet detection unit determines that the potential retransmission packet is the fast retransmission packet.

10. The apparatus of claim 9, wherein the statistic information storage unit stores information of only a preset size or larger in order of latest to oldest by using a ring buffer algorithm.

11. A packet processing method comprising:
initiating a session;
analyzing the packet information for each group of input/output packets that have the same packet information, wherein the packet information comprises a destination address, a source address, a destination port, a source port, and a protocol of a header; and
detecting a retransmission of an input/output packet and a duplicate acknowledgement (ACK) packet of the input/output packet using statistic information related to packet retransmission and the packet information when the session is initiated, wherein the statistic information is based on the packet information, a retransmission flag, a number of retransmissions of the input/output packet, and history information of ACKs resulting from the retransmissions of the input/output packet,
wherein the detecting of the retransmission packet and the duplicate ACK packet comprises:
determining whether a fast retransmission flag has been set by a previous detection process when determining that a potential retransmission packet is the retransmission packet;
determining the retransmission packet to be a fast retransmission packet when determining that the fast retransmission flag has been set and determining the retransmission packet to be a time-out retransmission packet when determining that the fast retransmission flag has not been set;
increasing a retransmission count when determining that the retransmission packet is the time-out retransmission packet; and
storing ACK information of the retransmission packet in the ACKs history information,
wherein the retransmission count is used as a conditional variable for detecting a duplicate ACK packet resulting from a time-out retransmission.

12. The method of claim 11, wherein the detecting of the retransmission packet and the duplicate ACK packet comprises:
detecting the potential retransmission packet which comprises a payload; and
determining whether the potential retransmission packet is the retransmission packet based on the ACKs history information.

13. The method of claim 11, wherein the detecting of the retransmission packet and the duplicate ACK packet comprises:
detecting a potential duplicate ACK packet which does not comprise a payload;
determining whether the potential duplicate ACK packet is likely to be the duplicate ACK resulting from the time-out retransmission or the duplicate ACK resulting in the fast retransmission based on the number of retransmissions; and
determining whether the potential duplicate ACK packet is the duplicate ACK packet resulting from the time-out retransmission or the duplicate ACK packet resulting in the fast retransmission based on the ACKs history information.

14. The method of claim 13, wherein in the determining of whether the potential duplicate ACK packet is likely to be the duplicate ACK resulting from the time-out retransmission or the duplicate ACK resulting in the fast retransmission, it is determined that the potential duplicate ACK packet is likely to be the duplicate ACK resulting from the time-out retransmission when the number of retransmissions is greater than zero and that the potential duplicate ACK packet is likely to be the duplicate ACK resulting in the fast retransmission when the number of retransmissions is zero or less than zero.

15. The method of claim 13, wherein the determining of whether the potential duplicate ACK packet is the duplicate ACK packet resulting from the time-out retransmission or the duplicate ACK packet resulting in the fast retransmission comprises:
determining that the potential duplicate ACK packet which is likely to be the duplicate ACK resulting from the time-out retransmission is the duplicate ACK packet resulting from the time-out retransmission when one or more ACKs matching the potential duplicate ACK packet exist in the ACKs history information; and
reducing the retransmission count.

16. The apparatus of claim 13, wherein the determining of whether the potential duplicate ACK packet is the duplicate ACK packet resulting from the time-out retransmission or the duplicate ACK packet resulting in the fast retransmission comprises:
determining that the potential duplicate ACK packet which is likely to be the duplicate ACK resulting in the fast retransmission is the duplicate ACK packet resulting in the fast retransmission when the number of ACKs matching the potential duplicate ACK packet in the ACKs history information is equal to or greater than a preset number; and
checking the fast retransmission flag.

17. The method of claim 13, wherein in the storing of the ACK information of the retransmission packet in the ACKs history information, ACK information of the time-out retransmission packet is stored in a time-out retransmission ACK history information when the retransmission packet is determined to be the time-out retransmission packet, and ACK information of the fast retransmission packet is stored in a fast retransmission ACK history information, which is separate from the time-out retransmission ACK history information, when the retransmission packet is determined to be the fast retransmission packet.

* * * * *